United States Patent
Guo et al.

(10) Patent No.: US 10,117,262 B2
(45) Date of Patent: Oct. 30, 2018

(54) METHOD, SYSTEM AND DEVICE FOR REPORTING UPLINK PILOT INTERFERENCE

(75) Inventors: Baojuan Guo, Beijing (CN); Dajun Zhang, Beijing (CN)

(73) Assignee: China Academy Of Telecommunications Technology, Beijing (CN)

( * ) Notice: Subject to any disclaimer, the term of this patent is extended or adjusted under 35 U.S.C. 154(b) by 504 days.

(21) Appl. No.: 13/382,931

(22) PCT Filed: Aug. 6, 2010

(86) PCT No.: PCT/CN2010/075777
§ 371 (c)(1),
(2), (4) Date: Jan. 8, 2012

(87) PCT Pub. No.: WO2011/015152
PCT Pub. Date: Feb. 10, 2011

(65) Prior Publication Data
US 2012/0106390 A1 May 3, 2012

(30) Foreign Application Priority Data

Aug. 6, 2009 (CN) .......................... 2009 1 0090756

(51) Int. Cl.
*H04W 72/12* (2009.01)
*H04B 7/26* (2006.01)

(52) U.S. Cl.
CPC ....... *H04W 72/1231* (2013.01); *H04B 7/2643* (2013.01)

(58) Field of Classification Search
CPC ..... H04W 16/32; H04W 24/02; H04W 24/04; H04W 24/10; H04W 88/08; H04W 88/12; H04W 72/082; H04W 72/1231
(Continued)

(56) References Cited

U.S. PATENT DOCUMENTS 6,795,689 B1 * 9/2004 Ogren et al. ............... 455/67.13
6,930,993 B1 * 8/2005 Hamada et al. ............ 370/347
(Continued)

FOREIGN PATENT DOCUMENTS

CN 1425259 A 6/2003
CN 1871871 A 11/2006
(Continued)

OTHER PUBLICATIONS

Meiling et al., An Optimization Method of UPPCH Interference Measurement, Published Jul. 2, 2009, Machine translation of WIPO doc. WO/2009079830 attained from WIPO website translation tool, pp. 1-12.*
(Continued)

*Primary Examiner* — Un C Cho
*Assistant Examiner* — Jeremy M Costin
(74) *Attorney, Agent, or Firm* — Ladas & Parry, LLP

(57) ABSTRACT

A method, a system and a device for reporting uplink pilot interference are provided, which are applied to time division duplex (TDD) system, and include: a base station measures uplink pilot time slot (UpPTS) interferences within respective cell portions; the base station transmits the uplink pilot time slot interferences, which carries the home cell portion IDs corresponding to the uplink pilot time slot interferences, to a radio network controller, and the radio network controller selects the transmitting position of the uplink pilot time slot for all cell portions according to the uplink pilot time slot interferences and the home cell portion IDs. The system realizes the reporting of the dedicated measurement in TDD system.

17 Claims, 6 Drawing Sheets

(58) Field of Classification Search
USPC ............... 370/337, 345–348, 442, 458, 500; 455/63.1, 63.2, 67.13
See application file for complete search history.

(56) References Cited

U.S. PATENT DOCUMENTS

| | | | |
|---|---|---|---|
| 8,175,604 B2 * | 5/2012 | Lohr et al. .................... | 455/442 |
| 2002/0015393 A1 * | 2/2002 | Pan ..................... | H04B 7/2618 |
| | | | 370/335 |

FOREIGN PATENT DOCUMENTS

| | | |
|---|---|---|
| CN | 101212797 A | 7/2008 |
| CN | 101242221 A | 8/2008 |
| EP | 2026477 A1 | 2/2009 |
| WO | WO2009079830 * 12/2007 | ............ H04B 17/00 |
| WO | 2009079830 A1 | 7/2009 |
| WO | 2009083927 A1 | 7/2009 |

OTHER PUBLICATIONS

International Search Report issued International Application No. PCT/CN2010/075777, dated Nov. 18, 2010.
European Patent Office, Extended European Search Report, European Patent Application No. 10806056.7, dated Sep. 13, 2016.
European Patent Office, Communication pursuant to Article 94(3) EPC, European Patent Application No. 10806056.7, dated Dec. 13, 2017.
CATT, ZTE "Definition of cell portion and related measurements in UTRAN"; 3GPP TSG RAN WG1 Meeting #57bis;R1-092810, Los Angeles, California, USA, Jun. 29-Jul. 3, 2009.

* cited by examiner

METHOD, SYSTEM AND DEVICE FOR REPORTING UPLINK PILOT INTERFERENCE

The present application is a national stage of PCT/CN2010/075777, which claims the priority of the Chinese patent application:

with the application date of Aug. 6, 2009, the application number of 200910090756.9, and the patent name of "method, system and device for reporting uplink pilot time slot interference", all content of the priority application is combined into the present application by quoting.

FIELD OF THE PRESENT INVENTION

The present invention relates to the field of wireless communication technology, and more particularly to method, system and device for reporting uplink pilot interference.

BACKGROUND OF THE PRESENT INVENTION

With the development of the third generation mobile telecommunication (3G), the design approach of base station tends to isolate the base band and radio frequency (RF), and the base band radio base station is that the base station with isolated base band and radio frequency. In the base band radio base station system, the distribution mode with base band unit (BBU) and remote RF unit (RRU) is widely used. The application of scene in which a plurality of smart antenna is used in a cell emerges, and even does the application of scene in which both channelizing application and smart antenna are supported in the multichannel of a cell.

For each specific antenna group coverage, we can define a cell portion, which is identified through cell portion identity (ID). Radio network controller (RNC) need to know the cell portion in which the terminal is located, so it can determine the initial launch power of terminal, and allocate specific frequency, slot time, code channel resources and so on. In addition, with the movement of the terminal in the different coverage areas, RNC need to know the position change of the terminal real-time, so as to carry out effective dynamic channel allocation (DCA). It can improve the throughput and resource utilization of the overall system efficiently through the radio resource management (RRM) optimization policy.

In the frequency-division duplex (FDD) system, if it supports cell portion, the reports for common measurement of the base station are all based on the cell portion, which is adding report based on cell portion on the basis of the original. It mainly comprises six measurements: transmitted carrier power based on cell portion, received total wide band power based on cell portion, transmitted carrier power of all codes not used for high speed physical downlink shared channel (HS-PDSCH), high-speed shared control channel (HS-SCCH), E-DCH absolute grant channel (E-AGCH), E-DCH HARQ acknowledgement indicator channel (E-HICH) based on cell portion, the power that the high-speed downlink shared channel (HS-DSCH) based on cell portion needs, the bit rate provided by HS-DSCH based on cell portion and receiving scheduling E-DCH power sharing based on cell portion.

In course of implementing the present invention, the inventor finds out there are at least the problems below in the present technology:

There is not corresponding report form which can be used for reporting a Time-Division Duplex (TDD) system-special dedicated measurement uplink pilot time slot interference in FDD system.

SUMMARY OF THE PRESENT INVENTION

The present invention provides a method, system and device for reporting uplink pilot interference, such that a base station measures uplink pilot time slot interferences and transmits them to a radio network controller.

The method for reporting uplink pilot interference provided in embodiments of the present invention, which is applied to a TDD system, comprises:

measuring, by a base station, uplink pilot time slot interferences in all uplink time slots within respective cell portions of a service cell;

transmitting, by said base station, said uplink pilot time slot interferences to a radio network controller, where each uplink pilot time slot interference carries an ID of a home cell portion corresponding to said each uplink pilot time slot interference; and selecting, by the radio network controller, a transmitting position of an uplink pilot time slot for all said cell portions according to said uplink pilot time slot interferences and said IDs of home cell portions corresponding to said uplink pilot time slot interferences.

The TDD system for transmitting uplink pilot time slot interference provided in embodiments of the present invention comprises:

a base station, used for measuring uplink pilot time slot interferences in all uplink time slots within respective cell portions of a service cell; transmitting said uplink pilot time slot interference to a radio network controller; where each uplink pilot time slot interference carries an ID of a home cell portion corresponding to said each uplink pilot time slot interference;

a radio network controller, used for receiving said uplink pilot time slot interferences measured and transmitted by said base station and the carried IDs of home cell portions corresponding to said uplink pilot time slot interferences; selecting a transmitting position of an uplink pilot time slot for all said cell portions according to the received uplink pilot time slot interferences and the IDs of home cell portions corresponding to said uplink pilot time slot interferences; informing said base station and a terminal of the selected transmitting position of said uplink pilot time slot.

A base station provided in embodiments of the present invention, which is applied to a TDD system, comprises:

a measuring module, for measuring uplink pilot time slot interferences in all uplink time slots within respective cell portions of a service cell;

a transmitting module, for transmitting said uplink pilot time slot interferences measured by said measuring module to a radio network controller, where each uplink pilot time slot interference carries an ID of a home cell portion corresponding to said each uplink pilot time slot interference, and said radio network controller selects the transmitting position of said uplink pilot time slot for all said cell portions according to said uplink pilot time slot interferences and said IDs of home cell portions.

A radio network controller provided in embodiments of the present invention, which is applied to a TDD system, comprises:

a receiving module, for receiving uplink pilot time slot interferences in all uplink slots within respective cell portions of a service cell transmitted by a base station and IDs of home cell portions corresponding to said uplink pilot time slot interferences;

a first selecting module, for selecting transmitting position of the uplink pilot time slot for all said cell portions according to said uplink pilot time slot interferences and said IDs of home cell portions.

In the embodiments of the present invention, the base station measures the UpPTS interferences and transmits them to the radio network controller, thereby realizing the reporting of the TDD system-special dedicated measurement UpPTS interferences; in addition, the radio network controller selects the transmitting position of the UpPTS according the received UpPTS interferences. Certainly, any product for performing embodiments of invention is not necessary to have all advantages mentioned above at the same time.

DETAILED DESCRIPTION OF THE EMBODIMENTS OF THE PRESENT INVENTION

To solve the above problems in the present technology, in the embodiments of the present invention, a base station measures uplink pilot time slot interferences within respective cell portions of a service cell, and transmits said uplink pilot time slot interferences, which carries IDs of home cell portions corresponding to said uplink pilot time slot interferences, to a radio network controller, therefore said radio network controller selects the transmitting position of the uplink pilot time slot for all said cell portions according to said uplink pilot time slot interferences and said IDs of home cell portions.

In the following parts, clear and complete descriptions of the technology programs of the present invention are made combined with drawings of the embodiments. It is clear that the embodiments of the present invention described here are only parts of the embodiments of the present invention. Based on the embodiments of the present invention, any other embodiments made by technical personnel of the field in the absence of creative work are all belong to the scope of the patent protection of the invention.

Figure 1:
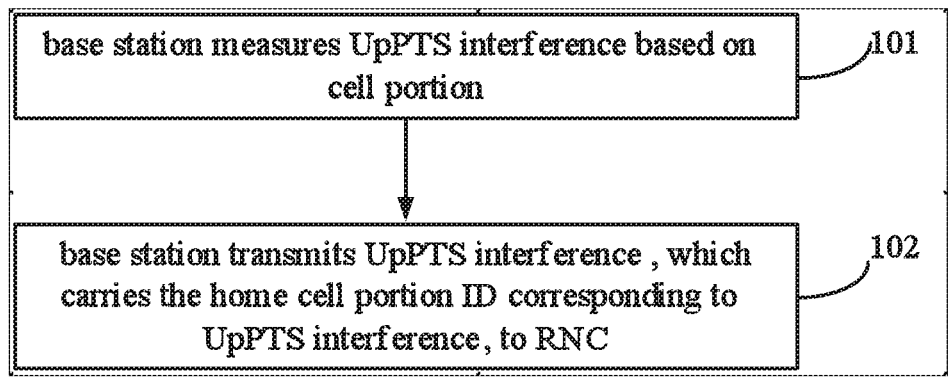
FIG. 1 is a flow diagram of a method for transmitting uplink pilot time slot interference of an embodiment of the present invention.

An embodiment of the present invention provides a method for transmitting uplink pilot time slot interference, as shown in FIG. 1, comprises the following steps.

In step 101, a base station measures UpPTS interferences within respective cell portions of a service cell.

In step 102, the base station transmits the UpPTS interferences to an RNC, where each UpPTS interference carries an ID of a home cell portion corresponding to said each UpPTS interference, therefore the RNC selects a transmitting position of an uplink pilot time slot according to the UpPTS interferences and the IDs of home cell portions corresponding to the UpPTS interferences.

In the embodiment of the present invention, the base station measures the UpPTS interferences and transmitting them to the radio network controller, thereby realizing the reporting of the TDD system-special dedicated measurement UpPTS interference; in addition, the radio network controller selects the transmitting position of the UpPTS according the received UpPTS interferences.

Figure 2:
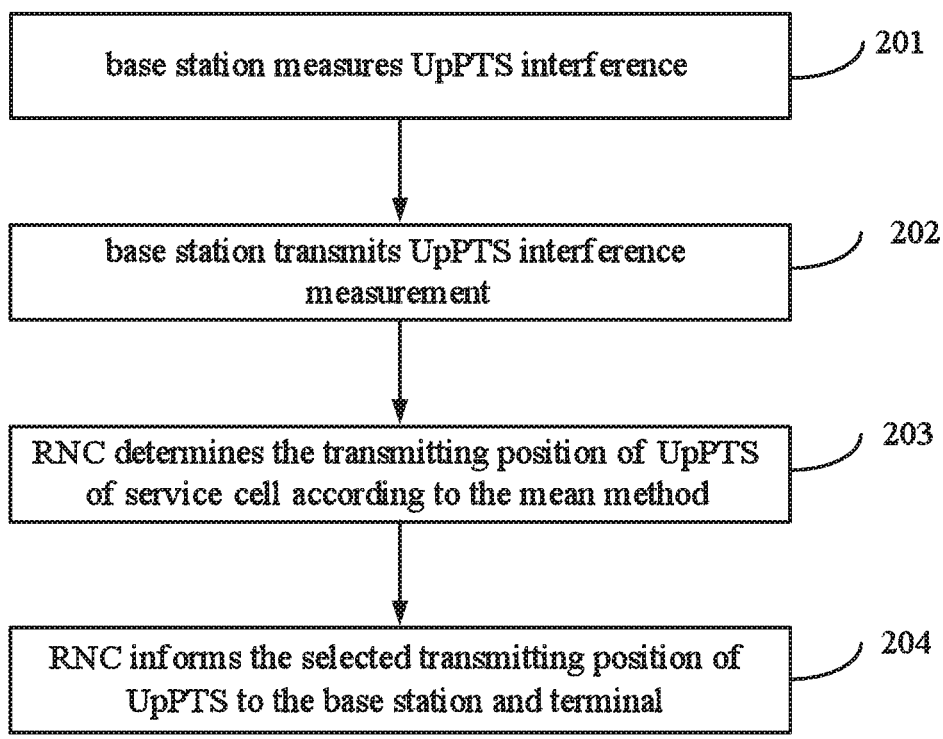
FIG. 2 is a flow diagram of a method for transmitting uplink pilot time slot interference of another embodiment of the present invention.

Another embodiment of the present invention provides a method for transmitting uplink pilot time slot interference, therein, an RNC selects a transmitting position of an UpPTS through a mean method, as shown in FIG. 2, comprises the following steps.

In step 201, a base station measures UpPTS interferences.

For an UpPTS interference measurement position corresponding to each uplink time slot, the base station measures common measurement UpPTS interference within respective cell portions of a service cell. Each uplink time slot can include more than one UpPTS interference measurement position, that is, can include more than one optional transmitting position of the UpPTS.

Specifically, supposing that the cell includes n cell portions, each cell portion includes m UpPTS interference measurement positions, and the acquired measurement result is Pij, where i can be equal to any natural number from 1 to n, indicating the i-th cell portion, and n is the total number of cell portions in the service cell; j indicates the j-th UpPTS interference measurement position, and m is the total number of UpPTS interference measurement positions in the service cell; so Pij indicates an UpPTS interference measurement of the j-th UpPTS interference measurement position in the i-th cell portion, and there are m*n Pij in total.

In step 202, the base station transmits the UpPTS interference measurements.

After the base station measures the UpPTS interference, it is necessary to transmit the acquired UpPTS interference measurements Pij to the RNC.

Specifically, the process of transmitting the UpPTS interference measurements by the base station comprises the following steps.

a) The base station sorts the measurement results.

When getting the UpPTS interference measurements Pij of respective UpPTS interference measurement positions within respective cell portions, the base station sorts all the Pij, and the sorting principle may be sorting the Pij according to the values of Pij, or may be sorting the Pij according to IDs of the cell portions corresponding to the Pij.

b) The base station transmits the UpPTS interference measurements.

The base station transmits the UpPTS interference measurements Pij of the respective UpPTS interference measurement positions within the respective cell portions, which are sorted in the step a), to the RNC, and the transmitting format is shown in Table 1.

TABLE 1 transmitting format of UpPTS interferences

Cell Portions List

>Cell Portion ID
>UpPTS interference value

Therein, UpPTS interference value is the value of the UpPTS interference measured by the base station, and cell portion ID is used for identifying each cell portion. As shown in Table 1, when the base station reposts the UpPTS interference, the ID of a home cell portion corresponding to the UpPTS interference is carried in the report, and the RNC can know the home cell corresponding to each UpPTS interference through the cell portion ID.

In step 203, the RNC determines the transmitting position of the UpPTS for the service cell according to the mean method.

After the RNC receives all the UpPTS interference measurements Pij sent by the base station, the RNC determines the transmitting position of the UpPTS for the service cell according to the received measurement results of respective UpPTS interference measurement positions within respective cell portions, and takes an UpPTS interference measurement position satisfying a preset condition as the transmitting position of the UpPTS to transmit the UpPTS, to ensure the access success rate of the UpPTS.

There are multiple methods for determining the transmitting position based on the measurement results of the respective UpPTS interference measurement positions within the respective cell portions, such as the mean method, a direct excluding method, and also can be a method that combining the load of business with any of the above two methods.

It takes the mean method for example to illustrate the technical programs in the embodiment of the present invention.

Specifically, the process that the RNC determines the transmitting position of the UpPTS for the service cell according to the received measurement results of the respective UpPTS interference measurement positions within the respective cell portions comprises the following steps:

(1) calculating the mean of UpPTS interference of each UpPTS interference measurement position.

The RNC receives all the UpPTS interference measurements Pij sent by the base station in step 201, and calculates the mean of the UpPTS interference measurements Pij of a same UpPTS interference measurement position in different cell portions, supposing it is Paver,j, therein, Paver,j indicates the mean of UpPTS interference measurements of the j-th UpPTS interference measurement position within the m cell portions of the cell.

(2) Selecting the transmitting position of the UpPTS.

A minimum mean of UpPTS interference measurements Paver,min is selected according to the means of UpPTS interference measurements of different UpPTS interference measurement positions Paver,j acquired in the above step (1), and the UpPTS interference measurement position corresponding to the Paver,min is the transmitting position of the UpPTS for the service cell, and the transmitting position of the UpPTS for all the cell portions in the cell are the same.

In step 204, the RNC informs the base station and a terminal about the selected transmitting position of the UpPTS.

Through the above selection, the RNC determines the transmitting position of the UpPTS. Then, the RNC informs the base station and the terminal of the selected transmitting position of the UpPTS. When the RNC informs the base station, it mainly uses the method that carrying the transmitting position of the UpPTS in the following four higher layers signaling: COMMON TRANSPORT CHANNEL RECONFIGURATION REQUEST, AUDIT RESPONSE, COMMON MEASUREMENT INITIATION REQUEST and RESOURCE STATUS INDICATION.

In the embodiment of the present invention, the base station measures the UpPTS interferences and transmits them to the radio network controller, thereby realizing the reporting of the TDD system-special dedicated measurement UpPTS interference; in addition, the radio network controller selects the transmitting position of the UpPTS according the received UpPTS interferences.

Figure 3:
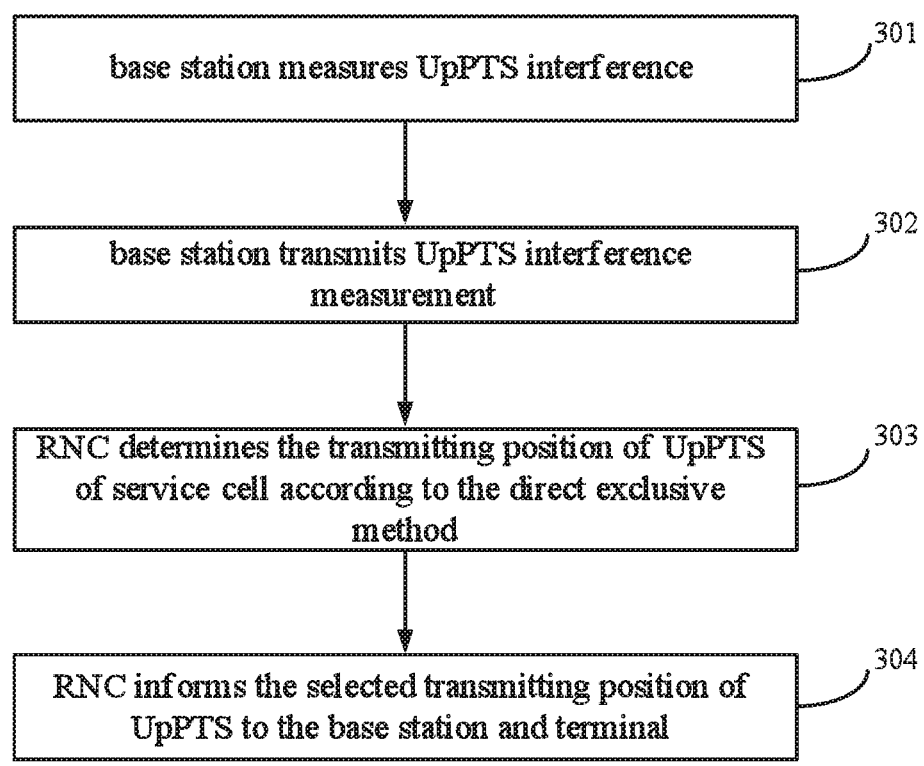
FIG. 3 is a flow diagram of a method for transmitting uplink pilot time slot interference of another embodiment of the present invention.

Another embodiment of the present invention provides a method for transmitting UpPTS interference, therein, the RNC selects the transmitting position of the UpPTS through the excluding method, as shown in FIG. 3, the method comprises the following steps.

In step 301, the base station measures UpPTS interferences.

For an UpPTS interference measurement position corresponding to each uplink time slot, the base station measures the common measurement UpPTS interferences within the respective cell portions.

Specifically, supposing that there are n cell portions in the cell, each cell portion includes m UpPTS interference measurement positions, and the acquired measurement result is Pij, therein, i can be equal to any natural number from 1 to n, indicating the i-th cell portion, and n is the total number of cell portions in the service cell; j indicates the j-th UpPTS interference measurement position, and m is the total number of UpPTS interference measurement positions in the service cell; so Pij indicates the UpPTS interference measurement of the j-th UpPTS interference measurement position in the i-th cell portion, and there are m*n Pij in total.

In step 302, the base station transmits the UpPTS interference measurements.

After the base station measures the UpPTS interferences, it is necessary to transmit the acquired UpPTS interference measurements Pij to the RNC.

Specifically, the process of transmitting the UpPTS interference measurements by the base station comprises the following steps.

a) The base station sorts the measurement results.

When getting the UpPTS interference measurements Pij of the respective UpPTS interference measurement positions within the respective cell portions, the base station sorts the Pij, and the sorting principle may be sorting the Pij according to the values of Pij, or may be sorting the Pij according to IDs of the cell portions corresponding to the Pij.

b) The base station transmits the UpPTS interference measurements.

The base station transmits the UpPTS interference measurements Pij of the respective UpPTS interference measurement positions within the respective cell portions sorted in the step a) to the RNC, and the transmitting format is shown in Table 2.

TABLE 2 transmitting format of UpPTS interferences

Cell Portions List

>Cell Portion ID
>UpPTS interference value

Therein, UpPTS interference value is the value of the UpPTS interference measured by the base station, and cell portion ID is used for identifying each cell portion. As shown in Table 2, when reporting the UpPTS interference, the base station carries the ID of a home cell portion corresponding to the UpPTS interference in the report message, and the RNC can know the home cell portion corresponding to each UpPTS interference through the cell portion ID.

In step 303, the RNC determines the transmitting position of the UpPTS for the service cell according to the direct excluding method.

After the RNC receives all the UpPTS interference measurements Pij sent by the base station, the RNC determines the transmitting position of the UpPTS for the service cell according to the received measurement results of the respective UpPTS interference measurement positions within the respective cell portions, and takes an UpPTS interference measurement position satisfying a preset condition as the transmitting position of the UpPTS to transmit the UpPTS, thereby ensuring the access success rate of the UpPTS.

There are multiple methods for determining the transmitting position through the measurement results of the respective UpPTS interference measurement positions within the respective cell portions, such as the mean method, the direct excluding method, and also can be the method that combining the load of business with any of the above two methods.

Here the direct excluding method is taken for example to illustrate the technical programs in the embodiment of the present invention.

Specifically, the process that the RNC determines the transmitting position of the UpPTS for the service cell according to the received measurement results of the respective UpPTS interference measurement position within the respective cell portions comprises the following steps:

(1) sorting the UpPTS interference measurement results.

The RNC receives all the UpPTS interference measurements Pij sent by the base station in step 301, and sorts the Pij according to the values of the Pij, the sort order can be ascending or descending.

(2) selecting the transmitting position of the UpPTS.

The Pij with the maximum value among the UpPTS interference measurements Pij sorted in the above step (1) is selected, the UpPTS interference measurement position corresponding to the selected Pij is excluded; then the above processes are repeated until a last remaining UpPTS interference measurement position is acquired, the last remaining UpPTS interference measurement position is determined as the transmitting position for the service cell, and the transmitting position for all the cell portions in the cell are the same.

For example, each of two UpPTS interference measurement positions corresponds to two UpPTS interference measurements, therein, the two UpPTS interference measurements corresponding to a first UpPTS interference measurement position are P11 and P12; the two UpPTS interference measurements corresponding to a second UpPTS interference measurement position are P21 and P22. The descending order of the four UpPTS interference measurements is P11, P21, P22, P12. Here, one of the two UpPTS interference measurements corresponding to the first UpPTS interference measurement position is the maximum one, and the other one is the minimum one. The maximum UpPTS interference measurement P11 is selected, and the first UpPTS interference measurement position corresponding to P11 is excluded. Then, there remains only one UpPTS interference measurement position, the remained UpPTS interference measurement position is selected as the transmitting position of the UpPTS for each cell portion in the cell.

It is necessary to explain that although the above first UpPTS interference measurement position also corresponds to the minimum UpPTS interference measurement P12, the measurement position should still be excluded because it corresponds to the maximum UpPTS interference measurement P11.

In step 304, the RNC informs the base station and the terminal of the selected transmitting position of the UpPTS.

Through the above selection, the RNC determines the transmitting position of the UpPTS. Then, the RNC informs the base station and the terminal of the selected transmitting position of the UpPTS. When the RNC informs the base station of the transmitting position of the UpPTS, it mainly uses the method that carrying the transmitting position of UpPTS in the following four information element (IE): COMMON TRANSPORT CHANNEL RECONFIGURATION REQUEST, AUDIT RESPONSE, COMMON MEASUREMENT INITIATION REQUEST and RESOURCE STATUS INDICATION.

In the embodiment of the present invention, the base station measures the UpPTS interferences and transmitting them to the radio network controller, thereby realizing the reporting of the TDD system-special dedicated measurement UpPTS interferences; in addition, the radio network controller selects the transmitting position of the UpPTS according to the received UpPTS interferences.

Figure 4:
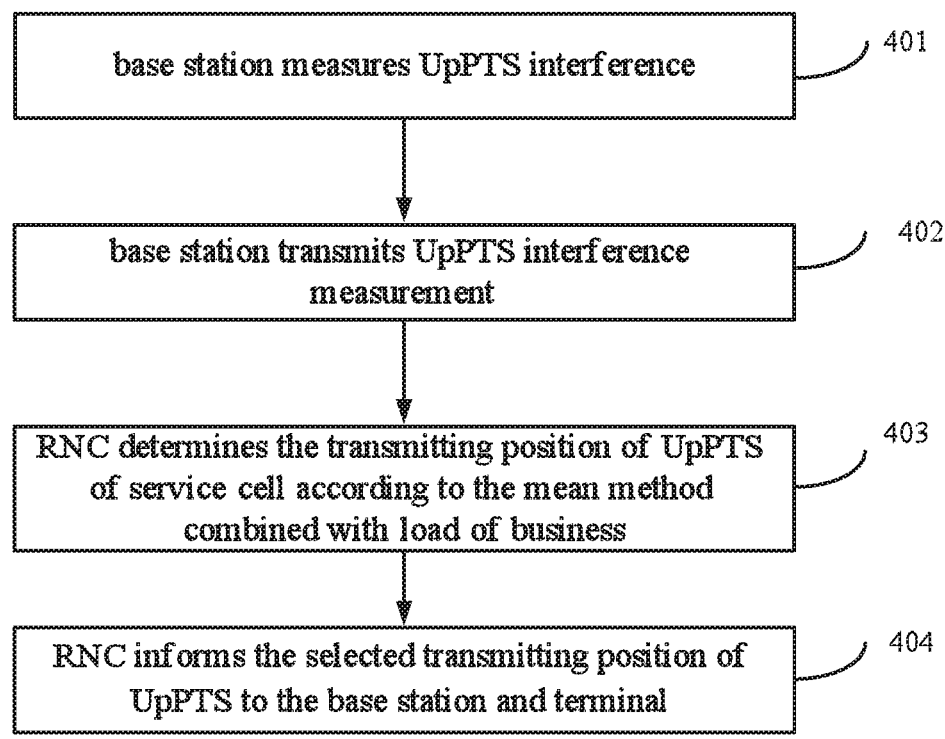
FIG. 4 is a flow diagram of a method for transmitting uplink pilot time slot interference of another embodiment of the present invention.

Another embodiment of the present invention provides a method for reporting UpPTS interference, therein, the RNC selects the transmitting position of the UpPTS through the mean method combined with load of business, as shown in FIG. 4, the method comprises the following steps.

In step 401, the base station measures UpPTS interferences.

For an UpPTS interference measurement position corresponding to each uplink time slot, the base station measures the common measurement UpPTS interferences within the respective cell portions.

Specifically, supposing that there are n cell portions in the cell, each cell portion including in m UpPTS interference measurement positions, and the acquired measurement result is Pij, therein, i can be equal to any natural number from 1 to n, indicating the i-th cell portion, and n is the total number of cell portions in the service cell; j indicates the j-th UpPTS interference measurement position, and m is the total number of UpPTS interference measurement positions in the service cell; so Pij indicates the UpPTS interference measurement of the j-th UpPTS interference measurement position in the i-th cell portion, and there are m*n Pij in total.

In step 402, the base station transmits UpPTS interference measurements.

After the base station measures the UpPTS interferences, it is necessary to transmit the acquired UpPTS interference measurements Pij to the RNC.

Specifically, the process of transmitting the UpPTS interference measurements by the base station comprises the following steps.

a) The base station sorts the measurement results.

When getting the UpPTS interference measurements Pij of the respective UpPTS interference measurement positions within the respective cell portions, the base station sorts the Pij, and the sorting principle may be sorting the Pij according to the values of Pij, or may be sorting the Pij according to IDs of the cell portions corresponding to the Pij.

b) The base station transmits the UpPTS interference measurements.

The base station transmits the UpPTS interference measurements Pij of the respective UpPTS interference measurement positions within the respective cell portions sorted in the step a) to the RNC, and the transmitting format is shown in Table 3.

TABLE 3 transmitting format of UpPTS interferences

Cell Portions List

>Cell Portion ID
>UpPTS interference value

Therein, UpPTS interference value is the value of the UpPTS interference measured by the base station, and cell portion ID is used for identifying each cell portion. As shown in Table 2, when reporting the UpPTS interference, the base station carries the ID of a home cell portion corresponding to the UpPTS interference in the report message, and the RNC can know the home cell portion corresponding to each UpPTS interference through the cell portion ID.

In step 403, the RNC determines the transmitting position of the UpPTS for the service cell according to the mean method combined with load of business.

After the RNC receives all the UpPTS interference measurements Pij sent by the base station, the RNC determines the transmitting position of the UpPTS for the service cell according to the received measurement results of the respective UpPTS interference measurement positions within the respective cell portions, and takes the UpPTS interference measurement position satisfying a preset condition as the transmitting position of the UpPTS to transmit the UpPTS, thereby ensuring the access success rate of the UpPTS.

There are multiple methods for determining the transmitting position through the measurement results of the respective UpPTS interference measurement positions within the respective cell portions, such as the mean method, the direct excluding method, and also can be the method that combining the load of business with any of the above two methods.

Here the mean method combined with load of business is taken for example to illustrate the technical programs in the embodiment of the present invention.

Specifically, the process that the RNC determines the transmitting position of the UpPTS for the service cell according to the received measurement results of the respective UpPTS interference measurement positions within the respective cell portions comprises the following steps:

(1) removing an UpPTS interference measurement position in an uplink time slot having large load of business.

The RNC acquires the uplink time slot having large load of business according to the load of businesses allocated to respective uplink time slots, and removes the UpPTS interference measurement position corresponding to the uplink time slot having large load of business.

Specifically, it comprises any of the following two cases to exclude the UpPTS interference measurement position corresponding to the uplink time slot having large load of business:

(a) the UpPTS interference measurement position corresponding to the uplink time slot having a largest load of business is removed; or (b) a threshold load of business is set, and the UpPTS interference measurement position corresponding to an uplink time slot having a load of business beyond the threshold is removed.

(2) calculating the mean of e UpPTS interferences of each UpPTS interference measurement position corresponding to each remaining uplink time slot.

The RNC receives all the UpPTS interference measurements Pij sent by the base station in step 401, and removes the UpPTS interference measurement positions corresponding to the uplink time slot removed in the above step (1), and calculates the mean of the UpPTS interference measurements Pij of each UpPTS interference measurement position in each remaining uplink time slot within different cell portions, supposing it is Paver,j, therein, Paver,j indicates the mean of UpPTS interference measurements of the j-th UpPTS interference measurement position within the m cell portions in the cell.

(3) selecting the transmitting position of the UpPTS.

A minimum mean of UpPTS interference measurements Paver,min is selected from the mean of UpPTS interference measurements of each UpPTS interference measurement position in each remaining uplink time slot Paver,j acquired in the above step (2), and the UpPTS interference measurement position corresponding to the Paver,min is determined as the transmitting position of the UpPTS for the service cell, and the transmitting position of the UpPTS for all the cell portions in the cell are the same.

In step 404, the RNC informs the base station and the terminal of the selected transmitting position of the UpPTS.

Through the above selection, the RNC determines the transmitting position of the UpPTS. Then, the RNC informs the base station and the terminal of the selected transmitting position of the UpPTS. When the RNC informs the base station of the transmitting position of the UpPTS, it mainly uses the method that carrying the transmitting position of the UpPTS in the following four information element (IE): COMMON TRANSPORT CHANNEL RECONFIGURATION REQUEST, AUDIT RESPONSE, COMMON MEASUREMENT INITIATION REQUEST and RESOURCE STATUS INDICATION.

In the embodiment of the present invention, the base station measures the UpPTS interferences and transmitting them to the radio network controller, thereby realizing the reporting of the TDD system-special dedicated measurement UpPTS interferences; in addition, the radio network controller selects the transmitting position of the UpPTS according to the received UpPTS interferences.

Figure 5:
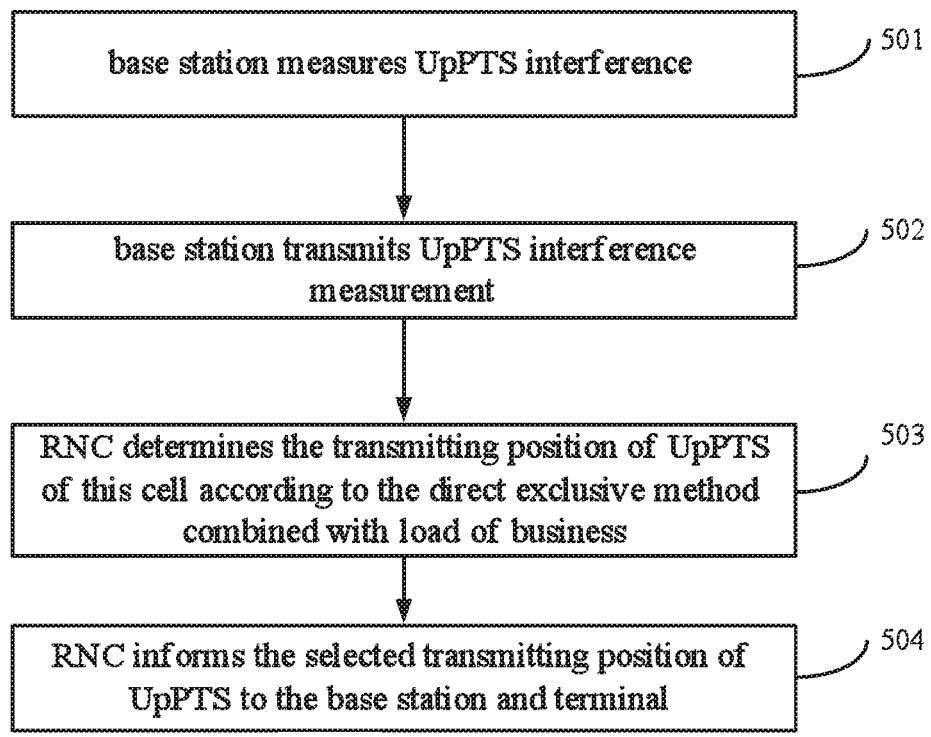
FIG. 5 is a flow diagram of a method for transmitting uplink pilot time slot interference of another embodiment of the present invention.

Another embodiment of the present invention provides a method for reporting UpPTS interference, therein, the RNC selects the transmitting position of the UpPTS through the excluding method combined with load of business, as shown in FIG. 5, the method comprises the following steps.

In step 501, the base station measures UpPTS interferences.

For an UpPTS interference measurement position corresponding to each uplink time slot, the base station measures the common measurement UpPTS interference within the respective cell portions.

Specifically, supposing that there are n cell portions in the cell, each cell portion includes m UpPTS interference measurement positions, and the acquired measurement result is Pij, therein, i can be equal to any natural number from 1 to n, indicating the i-th cell portion, and n is the total number of cell portions in service cell; j indicates the j-th UpPTS interference measurement position, and m is the total number of UpPTS interference measurement positions in service cell; so Pij indicates the UpPTS interference measurement of the j-th UpPTS interference measurement position in the i-th cell portion, and there are m*n Pij in total.

In step 502, the base station transmits UpPTS interference measurements.

After the base station measures the UpPTS interferences, it is necessary to transmit the acquired UpPTS interference measurements Pij to the RNC.

Specifically, the process of transmitting UpPTS interference measurements by the base station comprises the following steps.

a) The base station sorts the measurement results.

When getting the UpPTS interference measurements Pij of respective UpPTS interference measurement positions within respective cell portions, the base station sorts the Pij, and the sorting principle may be sorting the Pij according to the values of Pij, or may be sorting the Pij according to IDs of the cell portions corresponding to the Pij.

b) The base station transmits UpPTS interference measurements.

The base station transmits the UpPTS interference measurements Pij of the respective UpPTS interference measurement positions within the respective cell portions sorted in the step a) to the RNC, and the transmitting format is shown in Table 4.

TABLE 4 transmitting format of UpPTS interference

Cell Portions List

>Cell Portion ID
>UpPTS interference value

Therein, UpPTS interference value is the value of the UpPTS interference measured by the base station, and cell portion ID is used for identifying each cell portion. As shown in Table 2, when reporting UpPTS interference, the base station carries the ID of a home cell portion corresponding to the UpPTS interference in the report message, and the RNC can know the home cell portion corresponding to each UpPTS interference through the cell portion ID.

In step 503, the RNC determines the transmitting position of the UpPTS for the service cell according to the direct excluding method combined with load of business.

After the RNC receives all the UpPTS interference measurements Pij sent by the base station, the RNC determines the transmitting position of the UpPTS for the service cell according to the received measurement results of the respective UpPTS interference measurement positions within the respective cell portions, and takes the UpPTS interference measurement position satisfying a preset condition as the transmitting position of the UpPTS to transmit the UpPTS, thereby ensuring the access success rate of the UpPTS.

There are multiple methods for determining the transmitting position through the measurement results of the respective UpPTS interference measurement positions within the respective cell portions, such as the mean method, the direct excluding method, and also can be the method that combining the load of business with a of the above two methods.

Here the direct excluding method combined with load of business is taken for example to illustrate the technical proposal in the embodiment of the present invention.

Specifically, the process that the RNC determines the transmitting position of the UpPTS for the service cell according to the received measurement results of the respective UpPTS interference measurement positions within the respective cell portions comprises the following steps:

(1) removing an UpPTS interference measurement position corresponding to an uplink time slot having large load of business.

The RNC acquires the uplink time slot with large load of business according the load of businesses allocated to respective uplink time slots, and removes the UpPTS interference measurement positions corresponding to the uplink time slot having large load of business.

(2) sorting the UpPTS interference measurement results corresponding to UpPTS interference measurement positions in each remaining uplink time slot.

The RNC receives all the UpPTS interference measurements Pij sent by the base station in step 501, and removes the UpPTS interference measurement positions corresponding to the uplink time slot removed in the above step (1), and sorts the UpPTS interference measurement results according to UpPTS interference measurement positions in each remaining uplink time slot, the sort order can be ascending or descending.

(3) selecting the transmitting position of the UpPTS.

The Pij with a maximum value is selected from the UpPTS interference measurements Pij of the UpPTS interference measurement positions in each remaining uplink time slot sorted in the above step (1), the UpPTS interference measurement position corresponding to the selected Pij is excluded; the above processes are repeated until a last remaining UpPTS interference measurement position is acquired, the last remaining UpPTS interference measurement position is determined as the transmitting position of the UpPTS for the service cell, and the transmitting position of the UpPTS for all the cell portions in the cell are the same.

In step 504, the RNC informs the base station and the terminal of the selected transmitting position of the UpPTS.

Through the above selection, the RNC determines the transmitting position of the UpPTS. Then, the RNC informs the base station and the terminal of the selected transmitting position of the UpPTS. When the RNC informs the base station of the transmitting position of the UpPTS, it mainly uses the method that carrying the transmitting position of the UpPTS in the following four IE: COMMON TRANSPORT CHANNEL RECONFIGURATION REQUEST, AUDIT RESPONSE, COMMON MEASUREMENT INITIATION REQUEST and RESOURCE STATUS INDICATION.

In the embodiment of the present invention, the base station measures the UpPTS interferences and transmitting them to the radio network controller, thereby realizing the reporting of the TDD system-special dedicated measurement UpPTS interferences; in addition, the radio network controller selects the transmitting position of the UpPTS according the received UpPTS interferences.

Embodiments of the present invention provide a TDD system for transmitting uplink pilot time slot interference, comprising:

a base station, used for measuring uplink pilot time slot interferences in all uplink time slots within respective cell portions of a service cell; transmitting UpPTS interferences to an RNC; where each uplink pilot time slot interference carries an ID of a home cell portion corresponding to said each uplink pilot time slot interference, and the RNC selects the transmitting position of said uplink pilot time slot according to said uplink pilot time slot interferences and IDs of said home cell portions; and the RNC, used for receiving UpPTS interferences measured and sent by the base station and carried IDs of home cell portions corresponding to the UpPTS interferences; selecting the transmitting position of the UpPTS according to the received UpPTS interferences and the IDs of the home cell portions corresponding to the UpPTS interferences; and informing the base station and a terminal of the selected transmitting position of the UpPTS.

Figure 6:
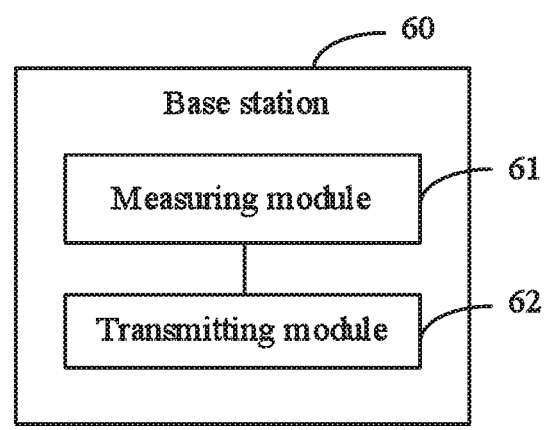
FIG. 6 is a structure diagram of a base station of embodiment of the present invention.

The base station 60 in the system, as shown in FIG. 6, comprises:

a measuring module 61, which is used for measuring UpPTS interferences in all uplink time slots within respective cell portions;

a transmitting module 62, which is used for transmitting the UpPTS interferences measured by said measuring module 61, which carry IDs of home cell portions corresponding to the UpPTS interferences, to the RNC, such that the RNC selects the transmitting position of the UpPTS according to the UpPTS interferences and said IDs of the home cell portion.

Figure 7:
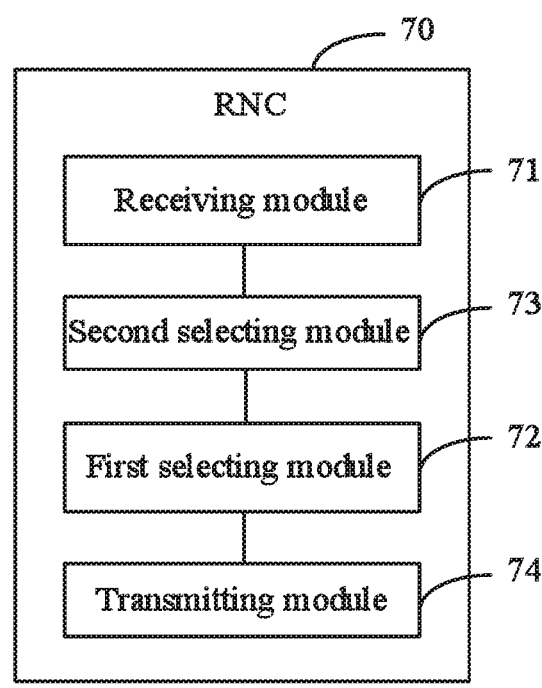
FIG. 7 is a structure diagram of an RNC of embodiment of the present invention.

The RNC 70 in the system, as shown in FIG. 7, comprises:

a receiving module 71, which is used for receiving UpPTS interferences and IDs of home cell portions corresponding to the UpPTS interferences transmitted by base station; and a first selecting module 72, which is used for selecting transmitting position of an uplink pilot time slot according to the UpPTS interferences and said IDs of home cell portions.

The first selecting module 72 is specifically used for:

acquiring a mean of UpPTS of each uplink pilot time slot interference measurement position within different cell portions; selecting an UpPTS interference measurement position corresponding to the minimum of the means as the transmitting position of the UpPTS; or, sorting the UpPTS interferences; excluding, according to a descending order of values of said uplink pilot time slot interferences. UpPTS interference measurement positions corresponding to the UpPTS interferences successively until there remains the last one UpPTS interference measurement position; selecting the remained last remaining UpPTS interference measurement position as the transmitting position of the UpPTS.

The RNC 70 further comprises:

a second selecting module 73, which is used for selecting the transmitting position of the UpPTS according to loads of business of the uplink time slots in which the UpPTS interference measurement positions locate.

The second selecting module 73 is specifically used for:

removing an UpPTS interference measurement position in an uplink time slot having a maximum load of business; or, setting a threshold load of business; removing the UpPTS interference measurement position in an uplink time slot whose load of business is beyond the threshold.

The RNC 70 further comprises:

a transmitting module 74, which is used for informing the base station of the transmitting position through carrying the transmitting position in a higher layers signaling.

In the embodiments of the present invention, the base station measures the UpPTS interferences and transmits them to radio network controller, thereby realizing the reporting of the TDD system-special dedicated measurement UpPTS interferences; in addition, the radio network controller selects the transmitting position of the UpPTS according to the received UpPTS interferences. Certainly, any product for performing embodiments of invention is not necessary to have all advantages mentioned above at the same time.

Through the description of the embodiments above, the technical personnel in this field can understand clearly that the present invention can be implemented by hardware or software and necessary current hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The descriptions above are just preferred implement ways of the present invention. It should be pointed that, for general technical personnel in this field, some improvement and decorating can be done, which should be as the protection scope of the present invention.

The invention claimed is:

1. A method for reporting uplink pilot interference, which is applied to a Time-Division Duplex (TDD) system, comprising:

measuring, by a base station, uplink pilot time slot (UpPTS) interferences in all uplink time slots within respective cell portions of a service cell, wherein coverages of the respective cell portions are different portions of a geographical service area of the service cell;

transmitting, by said base station, said uplink pilot time slot interferences to a radio network controller, wherein each uplink pilot time slot interference carries a list of the cell portions and an identity (ID) of a home cell portion corresponding to said each uplink pilot time slot interference; and selecting, by said radio network controller, a transmitting position of an uplink pilot time slot for all said cell portions according to said uplink pilot time slot interferences and said IDs of home cell portions corresponding to said uplink pilot time slot interferences, and the transmitting position is a same transmitting position in all said cell portions.

2. The method according to claim 1, wherein, said selecting, by said radio network controller, a transmitting position of an uplink pilot time slot according to said uplink pilot time slot interferences and IDs of home cell portions corresponding to said pilot time slot interferences, comprises:

determining, by said radio network controller, a transmitting position of an uplink pilot time slot within the respective cell portions of the service cell according to the measuring results of respective uplink pilot time slot interference measurement positions within said respective cell portions, each said uplink time slot comprising at least one of said uplink pilot time slot interference measurement positions; and taking, by said radio network controller, an uplink pilot time slot interference measurement position satisfying a preset condition as said transmitting position of said uplink pilot time slot.

3. The method according to claim 2, wherein, taking, by said radio network controller, an uplink pilot time slot interference measurement position satisfying a preset condition as said transmitting position of said uplink pilot time slot, comprises:
  acquiring, by said radio network controller, a mean of uplink pilot time slot interferences of each uplink pilot time slot interference measurement position within different cell portions; selecting, by said radio network controller, an uplink pilot time slot interference measurement position corresponding to the minimum of said means as said transmitting position of said uplink pilot time slot; or,
  sorting, by said radio network controller, said uplink pilot time slot interferences;
  excluding, by said radio network controller according to a descending order of values of said uplink pilot time slot interferences, uplink pilot time slot interference measurement positions corresponding to said uplink pilot time slot interferences successively until there remains only one uplink pilot time slot interference measurement position; selecting, by said radio network controller, said remained one uplink pilot time slot interference measurement position as said transmitting position of said uplink pilot time slot.

4. The method according to claim 3, wherein, before taking, by said radio network controller, an uplink pilot time slot interference measurement position corresponding to the minimum of said means as said transmitting position of said uplink pilot time slot, the method further comprises: removing, by said radio network controller, an uplink pilot time slot interference measurement position in an uplink time slot having a maximum load of business; or, removing, by said radio network controller, an uplink pilot time slot interference measurement position in an uplink time slot whose load of business is beyond a threshold load of business;
  wherein when said radio network controller selects said transmitting position of said uplink pilot time slot, except said removed uplink pilot time slot interference measurement position in said uplink time slot, said radio network controller acquires a mean of uplink pilot time slot interferences of each remained uplink pilot time slot interference measurement position within different cell portions, and selects an uplink pilot time slot interference measurement position corresponding to the minimum of said means as said transmitting position of said uplink pilot time slot.

5. The method according to claim 3, wherein, before taking, by said radio network controller, an uplink pilot time slot interference measurement position corresponding to the minimum of said means as said transmitting position of said uplink pilot time slot, the method further comprises: removing, by said radio network controller, an uplink pilot time slot interference measurement position in an uplink time slot having a maximum load of business;
  wherein when said radio network controller selects said transmitting position of said uplink pilot time slot, except said removed uplink pilot time slot interference measurement position in said uplink time slot, said radio network controller sorts the remained uplink pilot time slot interferences; excludes, according to a descending order of values of said uplink pilot time slot interferences, uplink pilot time slot interference measurement positions corresponding to said uplink pilot time slot interferences successively until there remains the last one uplink pilot time slot interference measurement position; and selects the remained last uplink pilot time slot interference measurement position as said transmitting position of said uplink pilot time slot.

6. The method according to claim 1, wherein, after selecting, by said radio network controller, a transmitting position of an uplink pilot time slot according to said uplink pilot time slot interferences and said IDs of home cell portions, the method further comprises:
  informing, by said radio network controller, said base station and a terminal of said transmitting position through a higher layers signaling carrying said transmitting position.

7. The method according to claim 1, wherein the quantity of the uplink pilot time slot interferences is equal to the quantity of the cell portions multiplied by the quantity of uplink pilot time slot interference measurement positions in all the uplink time slots, and each said uplink time slot comprises at least one of said uplink pilot time slot interference measurement positions.

8. A Time-Division Duplex (TDD) system for transmitting uplink pilot time slot interference, comprising:
  a base station, used for measuring uplink pilot time slot (UpPTS) interferences in all uplink time slots within respective cell portions of a service cell; transmitting said uplink pilot time slot interferences to a radio network controller; wherein coverages of the respective cell portions are different portions of a geographical service area of the service cell and each uplink pilot time slot interference carries a list of the cell portions and an identity (ID) of a home cell portion corresponding to said each uplink pilot time slot interference;
  a radio network controller, used for receiving said uplink pilot time slot interferences measured and transmitted by said base station, the list of the cell portions, and said carried IDs of home cell portions corresponding to said uplink pilot time slot interferences; selecting a transmitting position of an uplink pilot time slot for all said cell portions according to said received uplink pilot time slot interferences and said IDs of home cell portions corresponding to said uplink pilot time slot interferences; informing said base station and a terminal of said selected transmitting position of said uplink pilot time slot, wherein the transmitting position is a same transmitting position in all said cell portions.

9. The TDD system according to claim 8, wherein the quantity of the uplink pilot time slot interferences is equal to the quantity of the cell portions multiplied by the quantity of uplink pilot time slot interference measurement positions in all the uplink time slots, and each said uplink time slot comprises at least one of said uplink pilot time slot interference measurement positions.

10. A base station, which is applied to a Time-Division Duplex (TDD) system, comprising:
  a measuring module, used for measuring uplink pilot time slot (UpPTS) interferences in all uplink time slots within respective cell portions of a service cell, wherein coverages of the respective cell portions are different portions of a geographical service area of the service cell;
  a transmitting module, used for transmitting said uplink pilot time slot interferences measured by said measuring module to a radio network controller, wherein each uplink pilot time slot interference carries a list of the cell portions and an identity (ID) of a home cell portion corresponding to said each uplink pilot time slot interference, and said radio network controller selects a transmitting position of an uplink pilot time slot for all said cell portions according to said uplink pilot time slot interferences and said IDs of home cell portions, wherein the transmitting position is a same transmitting position in all said cell portions.

11. The base station according to claim 10, wherein the quantity of the uplink pilot time slot interferences is equal to the quantity of the cell portions multiplied by the quantity of uplink pilot time slot interference measurement positions in all the uplink time slots, and each said uplink time slot comprises at least one of said uplink pilot time slot interference measurement positions.

12. A radio network controller, which is applied to a Time-Division Duplex (TDD) system, comprising:
a receiving module, used for receiving uplink pilot time slot (UpPTS) interferences in all uplink slots within respective cell portions of a service cell transmitted by a base station, a list of the cell portions, and identities (IDs) of home cell portions corresponding to said uplink pilot time slot interferences, wherein coverages of the respective cell portions are different portions of a geographical service area of the service cell;
a first selecting module, used for selecting a transmitting position of an uplink pilot time slot for all said cell portions according to said uplink pilot time slot interferences and said IDs of home cell portions, and the transmitting position is a same transmitting position in all said cell portions.

13. The radio network controller according to claim 12, wherein, said first selecting module is specifically used for:
acquiring a mean of uplink pilot time slot interferences of each uplink pilot time slot interference measurement position within different cell portions; selecting an uplink pilot time slot interference measurement position corresponding to the minimum of said means as said transmitting position of said uplink pilot time slot; or,
sorting said uplink pilot time slot interferences; excluding, according to a descending order of values of said uplink pilot time slot interferences, uplink pilot time slot interference measurement positions corresponding to said uplink pilot time slot interferences successively until there remains the last one uplink pilot time slot interference measurement position; selecting the remained last uplink pilot time slot interference measurement position as said transmitting position of said uplink pilot time slot.

14. The radio network controller according to claim 12, further comprising:
a second selecting module, used for selecting said transmitting position of said uplink pilot time slot according to loads of business of uplink time slots in which said uplink pilot time slot interference measurement positions locate.

15. The radio network controller according to claim 14, wherein, said second selecting module is specifically used for:
removing an uplink pilot time slot interference measurement position in an uplink time slot having a maximum load of business; or,
setting a threshold load of business; removing an uplink pilot time slot interference measurement position in an uplink time slot whose load of business is beyond said threshold load of business.

16. The radio network controller according to claim 12, further comprising:
a transmitting module, used for informing said base station and a terminal of said transmitting position through carrying said transmitting position in a higher layers signaling.

17. The radio network controller according to claim 12, wherein the quantity of the uplink pilot time slot interferences is equal to the quantity of the cell portions multiplied by the quantity of uplink pilot time slot interference measurement positions in all the uplink time slots, and each said uplink time slot comprises at least one of said uplink pilot time slot interference measurement positions.

* * * * *